(12) United States Patent
Kim et al.

(10) Patent No.: US 8,982,445 B2
(45) Date of Patent: Mar. 17, 2015

(54) MICRO-FLUIDIC VARIABLE OPTICAL DEVICE ARRAY AND METHOD OF MANUFACTURING THE SAME

(71) Applicants: Samsung Electronics Co., Ltd., Suwon-si (KR); Seoul National University R&DB Foundation, Seoul (KR)

(72) Inventors: Eok-su Kim, Seongnam-si (KR); Yong-joo Kwon, Seoul (KR); Jung-mok Bae, Seoul (KR); Yoon-sun Choi, Yongin-si (KR); Jung-hoon Lee, Seoul (KR); Seung-yul Choi, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 13/889,827

(22) Filed: May 8, 2013

(65) Prior Publication Data

US 2014/0016175 A1 Jan. 16, 2014

(30) Foreign Application Priority Data

Jul. 16, 2012 (KR) ........................ 10-2012-0077363

(51) Int. Cl.
*G02B 26/00* (2006.01)
*G02B 3/14* (2006.01)

(52) U.S. Cl.
CPC ................ *G02B 26/005* (2013.01); *G02B 3/14* (2013.01)
USPC ...................................................... 359/290

(58) Field of Classification Search
CPC .... G06B 26/005; G06B 26/004; G06B 26/00; G06B 3/14; G06B 2207/115; G09G 3/348
USPC ......... 359/228, 245, 253, 290–292, 315, 665; 345/84, 41, 48, 60, 204
See application file for complete search history.

(56) References Cited

U.S. PATENT DOCUMENTS

| | | | |
|---|---|---|---|
| 7,755,841 | B2 | 7/2010 | Christenson et al. |
| 7,898,740 | B2 | 3/2011 | Heikenfeld et al. |
| 2012/0099205 | A1* | 4/2012 | Bae et al. ................ 359/620 |

FOREIGN PATENT DOCUMENTS

| | | |
|---|---|---|
| JP | 2011248211 A | 12/2011 |
| KR | 1020080029870 A | 4/2008 |
| KR | 1020100112902 A | 10/2010 |
| KR | 100992090 B1 | 11/2010 |

OTHER PUBLICATIONS

Hou et al., "A full description of a scalable microfabrication process for arrayed electrowetting microprisms", J. Micromech. Microeng. 20 (2010), 13 pages total.

(Continued)

*Primary Examiner* — Tuyen Tra
(74) *Attorney, Agent, or Firm* — Sughrue Mion, PLLC

(57) ABSTRACT

A variable optical device array includes: a transparent substrate; an addressing layer including an electrode wire arranged on the transparent substrate; a barrier wall portion disposed on the addressing layer to define cell regions and including conductive barrier walls that are electrically connected to the electrode wire, wherein pairs of the conductive barrier walls are arranged to form double walls; an insulation material filling a region between each pair of conductive barrier walls; a conductive first fluid and a nonconductive second fluid disposed in each of the cell regions, wherein the first and second fluids are not mixed; an insulation coating layer disposed on a top surface of each of the conductive barrier walls and on side surfaces of each of the cell regions; a transparent electrode layer covering the cell regions; and a voltage applying unit to apply a voltage between the transparent electrode layer and the addressing layer.

20 Claims, 11 Drawing Sheets

(56) References Cited

OTHER PUBLICATIONS

Berge et al., "Variable focal lens controlled by an external voltage: An application of electrowetting", Eur. Phys. J.E 3, pp. 159-163 (2000), Received Dec. 1, 1999.

Krupenkin et al., "Tunable liquid microlens", Applied Physics Letters, vol. 82, No. 3, Jan. 20, 2003.

Kuiper et al., "Variable-focus liquid lens for miniature cameras", Applied Physics Letters, vol. 85, No. 7, Aug. 16, 2004.

* cited by examiner

MICRO-FLUIDIC VARIABLE OPTICAL DEVICE ARRAY AND METHOD OF MANUFACTURING THE SAME

CROSS-REFERENCE TO RELATED APPLICATION

This application claims priority from Korean Patent Application No. 10-2012-0077363, filed on Jul. 16, 2012, in the Korean Intellectual Property Office, the disclosure of which is incorporated herein in its entirety by reference.

BACKGROUND

1. Field

Apparatuses and methods consistent with exemplary embodiments relate to a micro-fluidic variable optical device array and a method of manufacturing the same.

2. Description of the Related Art

Electrowetting technologies are increasingly applied to various variable optical devices. The electrowetting technologies change a contact angle of conductive liquid by applying a voltage between the conductive liquid and an electrode coated with an insulator to control surface tension of the conductive liquid. For example, when a conductive fluid and a nonconductive fluid are disposed in a cell including an electrode pattern to contact each other, an interface location or shape of the conductive and nonconductive fluids may be changed via an electrowetting method, and a variable iris, a variable prism, or a variable focus lens may be realized by adjusting a detailed shape of the electrode pattern or a channel shape for a fluid flow.

Also, studies have recently been reported on minute variable lens arrays in which variable fluid lenses having a minute size are arranged in an array. A minute variable lens array may be used to realize a 3-dimensional graphic that is viewable in many angles without glasses by being attached to a front surface of a display. Alternatively, the minute variable lens array may be used in an optical analysis apparatus capable of simultaneously observing optical changes of cells by being attached to a multi-cell plate for a biochemical experiment.

In order to realize the minute variable lens array, minute spaces that are filled with the conductive fluid and the nonconductive fluid, while not being mixed, are formed into an array, and a process of forming an electrode on a wall surface of each minute space is required. However, when a photolithography technology is used to form the electrode on the wall surface of each minute space, since an interval has to exist between the wall surface and a mask for exposure, light diffraction intensifies and light is obliquely irradiated on the wall surface, and thus, the uniformity of exposure is decreased, thereby causing difficulties in precise patterning.

SUMMARY

Provided are a micro-fluidic variable optical device array and a method of manufacturing the same.

According to an aspect of an exemplary embodiment, there is provided a variable optical device array including: a transparent substrate; an addressing layer disposed on the transparent substrate and comprising an electrode wire arranged in a predetermined pattern; a barrier wall portion disposed on the addressing layer to define a plurality of cell regions and comprising a plurality of conductive barrier walls that are electrically connected to the electrode wire, wherein pairs of the plurality of conductive barrier walls are arranged to form double walls surrounding cell regions; an insulation material filling a region between each pair of conductive barrier walls forming the double walls; a conductive first fluid and a nonconductive second fluid disposed in each of the plurality of cell regions, wherein the first and second fluids are not mixed; an insulation coating layer disposed on a top surface of each of the plurality of conductive barrier walls and on side surfaces of each of the plurality of cell regions; a transparent electrode layer covering the plurality of cell regions; and a voltage applying unit that that is configured to apply a voltage between the transparent electrode layer and the addressing layer.

The variable optical device array may further include an insulation layer disposed between the addressing layer and the barrier wall portion. The plurality of conductive barrier walls and the electrode wire may be connected via a conductive through-hole penetrating through the insulation layer.

The electrode wire may include a plurality of electrodes that are electrically separated from each other.

The plurality of cell regions may be arranged in a two-dimensional array, and the plurality of electrodes may be separated in a pattern that equally drives cell regions on the same column from among the plurality of cell regions.

The addressing layer may further include a plurality of transistors for independently driving each of the plurality of cell regions.

The variable optical device array may further include a control unit for measuring an interface shape between the conductive first fluid and the nonconductive second fluid in the plurality of cell regions, and feeding back a result of measuring to the voltage applying unit to adjust the voltage between the transparent electrode layer and the addressing layer.

The variable optical device array may further include an apparatus for measuring electrostatic capacity between the transparent electrode layer and any one of the plurality of electrodes.

The conductive first fluid may be a polar fluid and the nonconductive second fluid may be a nonpolar fluid. The conductive first fluid may be an electrolyte and the nonconductive second fluid may be oil.

According to an aspect of another exemplary embodiment, there is provided a method of manufacturing a variable optical device array, the method including: forming an addressing layer comprising an electrode wire arranged in a predetermined pattern on a transparent substrate; forming a barrier wall portion on the addressing layer to define a plurality of cell regions, wherein the barrier wall portion comprises a plurality of conductive barrier walls electrically connected to the electrode wire, pairs of the plurality of conductive barrier walls are arranged to form double walls surrounding the plurality of cell regions; filling a space between each of the double walls with an insulation material; forming an insulation coating layer on a top surface of each of the plurality of conductive barrier walls and sides of each of the plurality of cell regions; disposing a conductive first fluid and a nonconductive second fluid in each of the plurality of cell regions, wherein the first and second fluids are not mixed; and forming a transparent electrode layer on the plurality of cell regions.

The method may further include, before the forming of the barrier wall portion, forming an insulation layer on the addressing layer. The method may further include forming a plurality of conductive through-holes through the insulation layer, wherein the through-holes are connected to the electrode wire through the insulation layer.

The forming of the barrier wall portion may include: forming a photoresist mold including a plurality of holes respectively corresponding to the plurality of conductive barrier walls, on the addressing layer; and forming a metal material in the plurality of holes.

The photoresist mold may be formed of SU-8 photoresist or KMPR.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
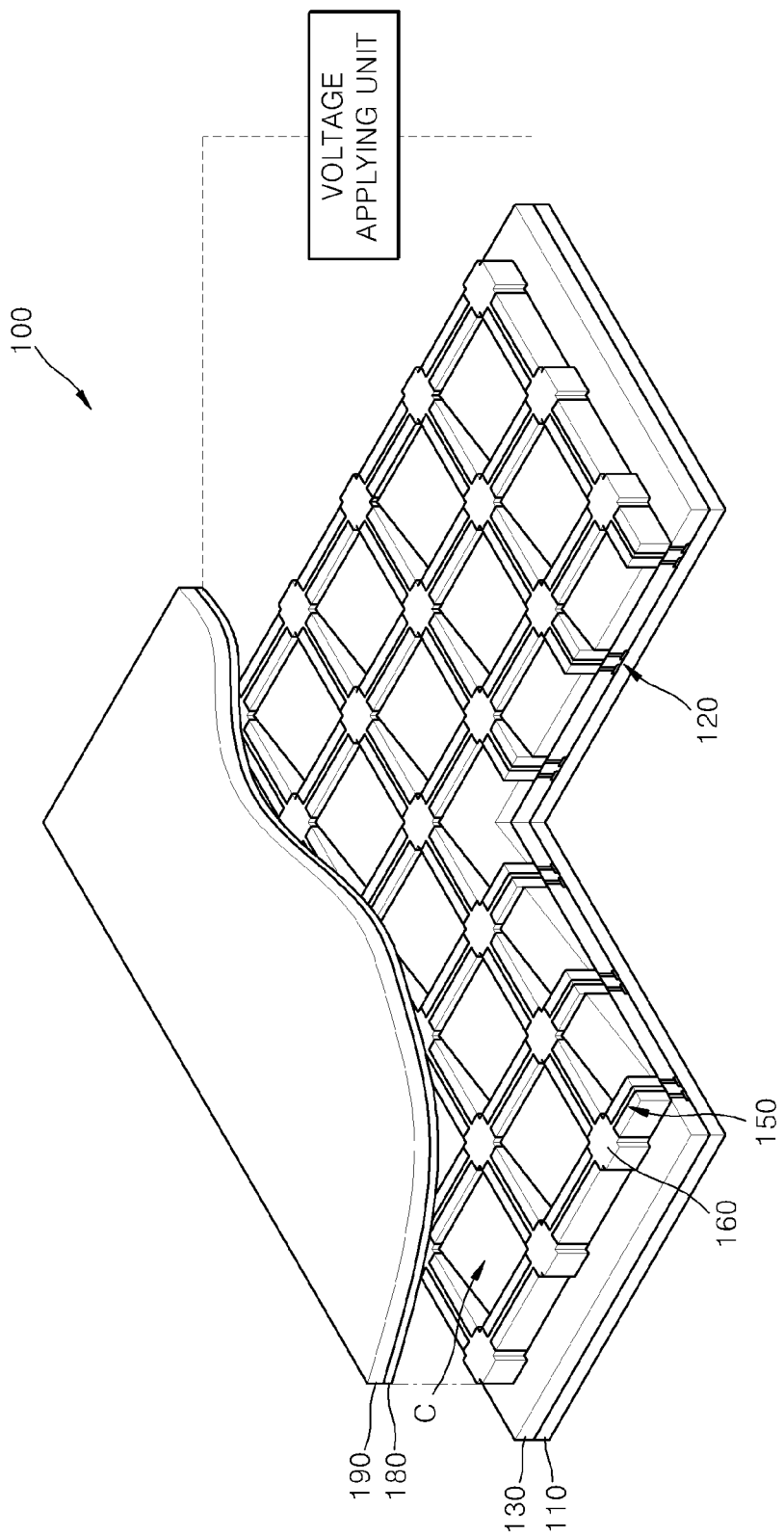
FIG. 1 is a partially exposed exploded perspective view illustrating a schematic structure of a variable optical device array according to an exemplary embodiment.

Exemplary embodiments will now be described in detail with reference to the accompanying drawings, wherein like reference numerals refer to like elements throughout, and the size of each element may be exaggerated for clarity.

Figure 2:
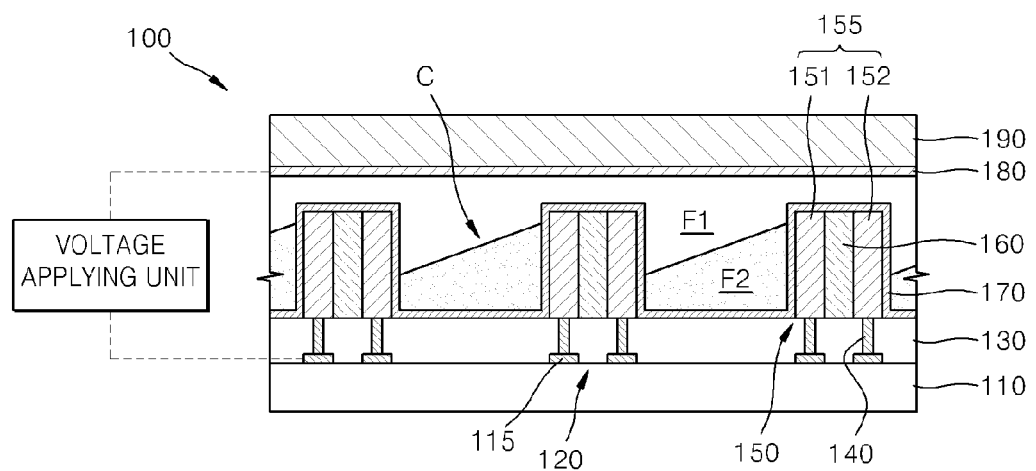
FIG. 2 is a cross-sectional view illustrating in detail shapes of some cells of the variable optical device array of FIG. 1.
Figure 3:
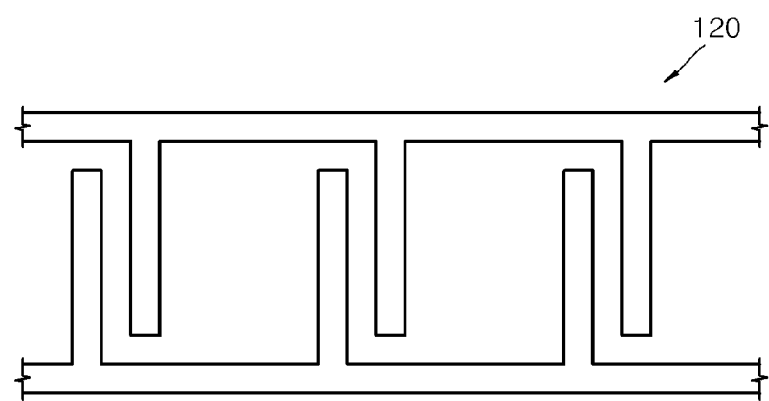
FIG. 3 is a plan view of an example of an electrode wire forming an addressing layer of the variable optical device array of FIG. 1.

FIG. 1 is a partially exposed exploded perspective view illustrating a schematic structure of a variable optical device array 100 according to an exemplary embodiment, FIG. 2 is a cross-sectional view illustrating in detail shapes of some cells of the variable optical device array 100 of FIG. 1, and FIG. 3 is a plan view of an example of an electrode wire forming an addressing layer 120 of the variable optical device array 100 of FIG. 1. For convenience, some elements are not illustrated in FIG. 1.

Referring to FIGS. 1 through 3, the variable optical device array 100 includes a first substrate 110, the addressing layer 120 disposed on the first substrate 110 and including the electrode wire 115 arranged in a predetermined pattern, a barrier wall portion 150 formed on the addressing layer 120 to divide a plurality of cell regions C, a conductive first fluid F1 and a nonconductive second fluid F2 that is not mixed with the conductive first fluid F1, which are disposed in the cell regions C, a transparent electrode layer 180 covering all the cell regions C, and a voltage applying unit that applies a voltage between the transparent electrode layer 180 and the addressing layer 120.

In the current exemplary embodiment, the barrier wall portion 150 includes a plurality of separated conductive barrier walls, and thus, each cell is easily independently driven. The barrier wall portion 150 has a structure such that a photolithography process with respect to wall surface of the each cell is not needed during a manufacturing process.

Accordingly, the barrier wall portion 150 includes a plurality of conductive barrier walls that are electrically connected to the electrode wire 115 constituting the addressing layer 120 and are disposed in pairs to form a double wall 155, which includes a pair of conductive barrier walls 151 and 152 spaced apart from each other. In other words, the cell regions C are divided by the double wall 155, and the pair of conductive barrier walls 151 and 152 constituting the double wall 155 operates as electrodes, respectively driving different adjacent cell regions C.

A detailed structure and materials of the variable optical device array 100 will now be described.

The first substrate 110 may be a substrate formed of glass having a transparent characteristic or transparent plastic.

The addressing layer 120 includes the electrode wire 115 arranged in the predetermined pattern that drives the plurality of cell regions C. The electrode wire 115 may include a plurality of electrodes that are electrically isolated from each other. For example, the cell regions C may be arranged in a two-dimensional array as shown in FIG. 1, and at this time, the plurality of electrodes of the addressing layer 120 may have a structure separated into patterns equally driving cell regions C on the same column from among the cell regions C. The electrode wire 115 may be formed of a conductive material such as, for example, gold, silver, copper, aluminum, molybdenum, chromium, titanium, tungsten, tantalum, magnesium, or ruthenium, an alloy or compound thereof, or a conductive oxide.

The addressing layer 120 may further include a plurality of transistors (not shown) for independently driving the cell regions C.

An insulation layer 130 covering the entire electrode wire 115 may be formed on the addressing layer 120. In such case, a conductive through-hole 140 for electrically connecting the barrier wall portion 150 and the electrode wire 115 may be further formed through the insulation layer 130.

The barrier wall portion 150 having such a structure provides the ability to easily address individual cell regions C such that an electrowetting operation is independently performed in the cell regions C since the conductive barrier walls 151 and 152 constituting the barrier wall portion 150 are all separated from each other and are electrically connected to the addressing layer 120 through the conductive through-hole 140.

An insulation material 160 is filled in a region between the double wall 155 constituting the barrier wall portion 150, i.e., between the pair of conductive barrier walls 151 and 152 of the double wall 155, and thus, the pair of conductive barrier walls 151 and 152 are insulated from each other. As shown in FIGS. 1 and 2, the insulation material 160 may be formed to entirely connect the region between the pair of conductive barrier walls 151 and 152 constituting the double wall 155 and a region between adjacent double walls 155.

An insulation coating layer 170 is formed on top surfaces of the conductive barrier walls 151 and 152, and side surfaces of the cell regions C, i.e., side surfaces of the conductive barrier walls 151 and 152, which are inner walls of the cell regions C. As shown in FIG. 2, the insulation coating layer 170 may be formed throughout the barrier wall portion 150, the insulation material 160, and bottom surfaces of the cell regions C for convenience of processes.

The conductive first fluid F1 and the nonconductive second fluid F2 $t$ are disposed in the plurality of cell regions C. As shown in FIG. 2, the conductive first fluid F1 and the nonconductive second fluid F2 are not mixed with each other, wherein the conductive first fluid F1 is disposed on the nonconductive second fluid F2 to contact the transparent electrode layer 180. The conductive first fluid F1 may be a polar fluid and the nonconductive second fluid F2 may be a nonpolar fluid. The conductive first fluid F1 may be an electrolyte, for example, water or salt water. The nonconductive second fluid F2 may be an oil.

The transparent electrode layer 180 may be disposed to entirely cover the cell regions C so as to operate as a common electrode that drives each cell region C. As shown in FIGS. 1 and 2, the transparent electrode layer 180 may be attached to a second substrate 190 having a transparent characteristic and disposed to face all the cell regions C. The transparent electrode layer 180 may be formed of a transparent conductive material, for example, metal oxide such as indium tin oxide (ITO) or indium zinc oxide (IZ), a nano-particle dispersed thin film of metal such as gold (Au) or silver (Ag), a carbon nano-structure such as carbon nanotube (CNT) or graphene, or a conductive polymer such as poly(3,4-ethylenedioxythiophene) (PEDOT), polypyrrole (PPy), or poly(3-hexylthiophene) (P3HT).

The variable optical device array 100 having the above structure may function as a prism that diffracts an incident light in a desired direction or as a lens that gathers or disperses an incident light as an interface of the conductive first fluid F1 and the nonconductive second fluid F2 disposed in each cell region C changes according to the electrowetting operation. When the voltage applying unit applies a voltage between the transparent electrode layer 180 and the addressing layer 120, a voltage between the conductive first fluid F1 and the conductive barrier wall 151 or 152 $t$ is formed in a corresponding cell region C. Accordingly, a shape of an interface between fluids changes as a contact angle changes according to interfacial tension at a three-phase contact line (TCL) of the conductive first fluid F1, the nonconductive second fluid F2, and the insulation coating layer 170. As shown in FIG. 2, the interface of the conductive first fluid F1 and the nonconductive second fluid F2 forms a prism refracting an incident light in a predetermined direction, and interfaces having the same shape are formed in adjacent cell regions C, but exemplary embodiments may vary.

FIGS. 4A through 4D are cross-sectional views illustrating fluid interface changes in cell regions C constituting the variable optical device array 100 of FIG. 1.

Figure 4A:
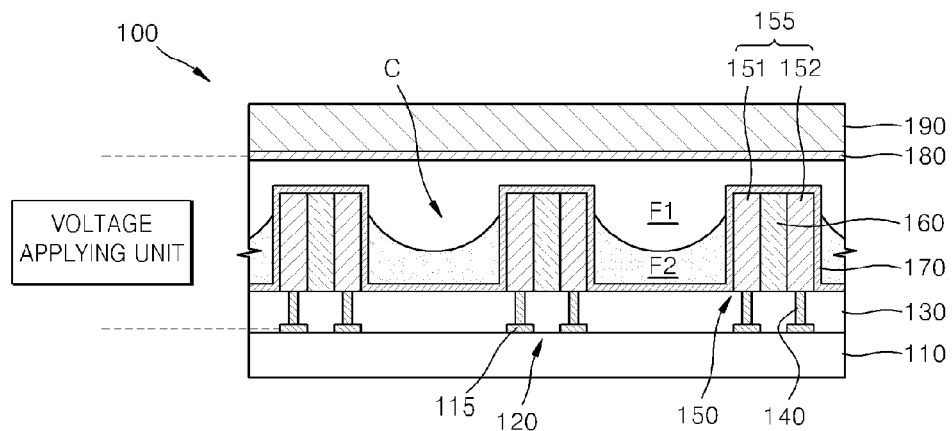
FIGS. 4A through 4D are cross-sectional views illustrating fluid interface changes in cell regions constituting the variable optical device array of FIG. 1.
Figure 4B:
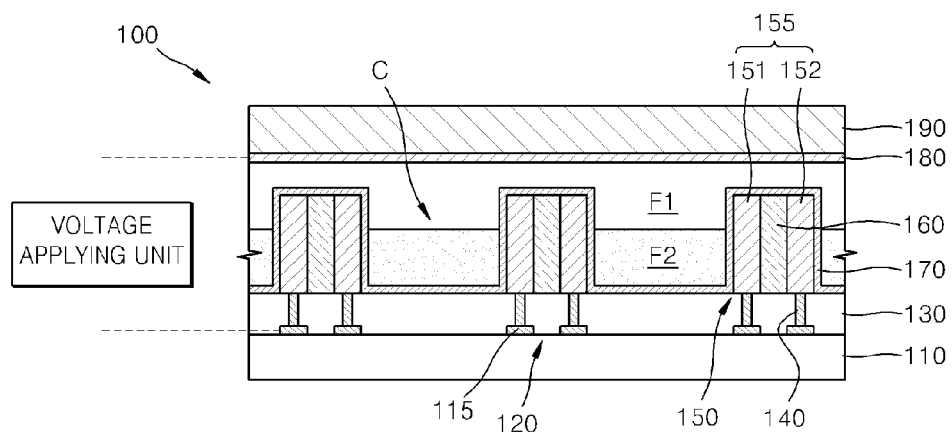
Figure 4C:
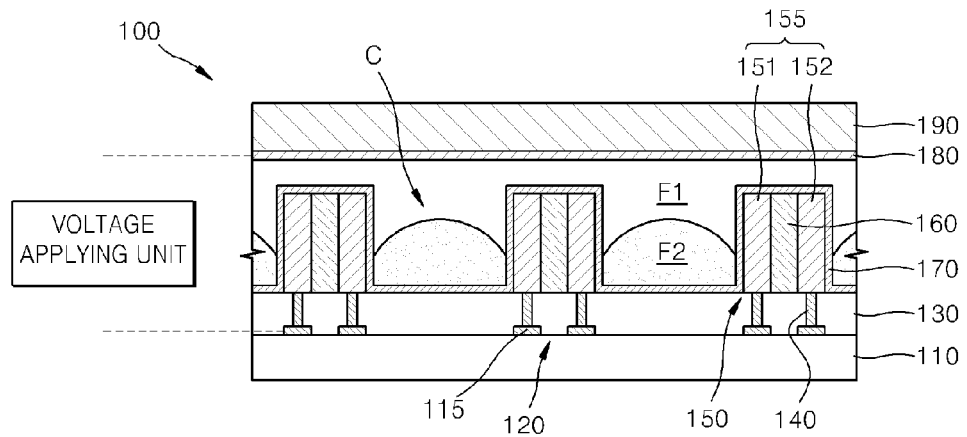
Figure 4D:
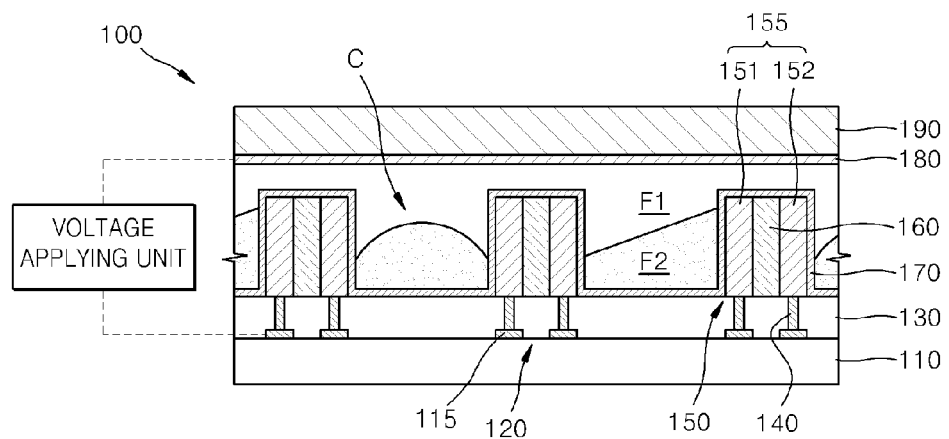

In FIG. 4A, the interface between the conductive first fluid F1 and the nonconductive second fluid F2 has a concave lens shape. In FIG. 4B, the interface forms a plane surface, and in FIG. 4C, the interface has a convex lens shape. The adjacent cell regions C may be driven to form different interfaces as shown in FIG. 4D, for example. As shown in FIG. 4D, the interface in the right cell region C may have a prism shape and the interface in the left cell region C may have a convex lens shape.

Alternatively, the cell regions C may be arranged in a two-dimensional array and the interfaces may form lens surfaces having different refractive powers according to locations of the cell regions C, or prisms having different refractive angles. Alternatively, only some cell regions C may be selectively driven.

Figure 5:
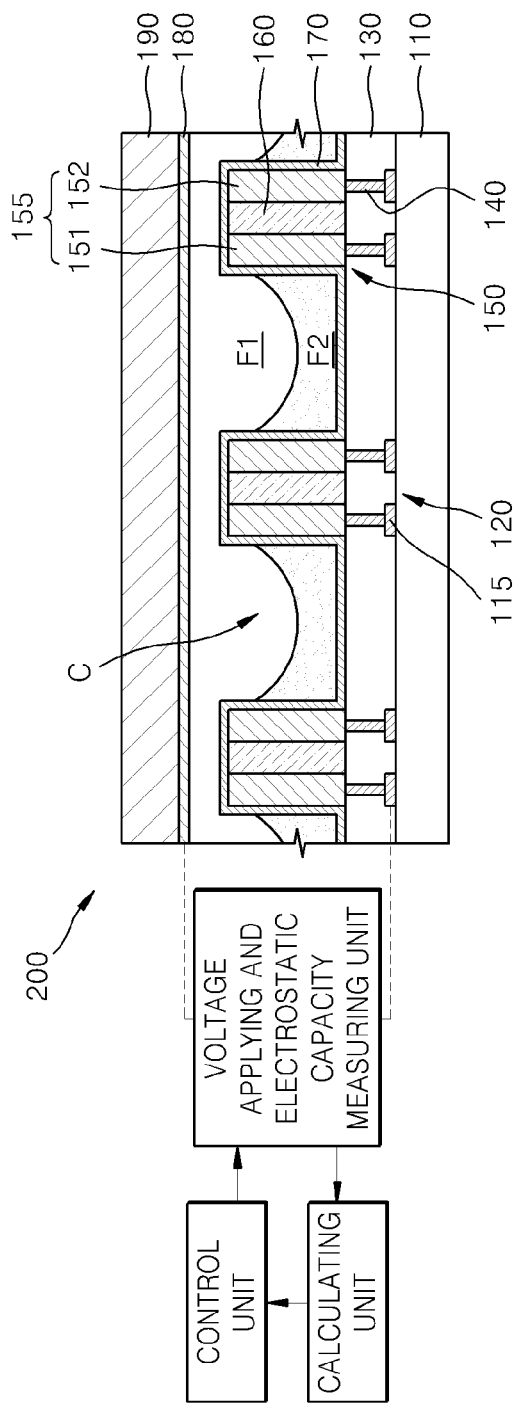
FIG. 5 is a cross-sectional view illustrating a schematic structure of a variable optical device array according to another exemplary embodiment.

FIG. 5 is a cross-sectional view illustrating a schematic structure of a variable optical device array 200 according to another exemplary embodiment.

The variable optical device array 200 of the current exemplary embodiment is different from the variable optical device array 100 of FIG. 1 since the variable optical device array 200 includes a structure that measures an interface shape between the conductive first fluid F1 and the nonconductive second fluid F2 with respect to the plurality of cell regions C and feeds back a result of measuring to adjust an applied voltage.

The variable optical device array 200 may include a voltage applying and electrostatic capacity measuring unit, a calculating unit, and a control unit.

For example, the voltage applying and electrostatic capacity measuring unit may measure electrostatic capacity between the transparent electrode layer 180 and any one of the plurality of electrodes forming the addressing layer 120 while applying a voltage, and the calculating unit may estimate the interface shape based on the result of measuring and calculate voltage to be applied for forming a desired interface shape. The control unit may adjust the voltage by feeding back the result of calculating to the voltage applying and electrostatic capacity measuring unit. As such, the interface shape formed in each of the cell regions C may be further precisely adjusted.

In the variable optical device arrays 100 and 200 described above, the addressing layer 120 is easily formed to independently generate electrowetting in each cell since the plurality of conductive barrier walls 151 and 152 are separated from each other on the first substrate 110.

Also, the variable optical device arrays 100 and 200 may employ a structure that both measures electrostatic capacity and feeds back a result of measuring to the voltage applying unit to adjust a fluid interface, and thus the fluid interface may be more precisely adjusted.

FIGS. 6A through 6K are views for describing a method of manufacturing a variable optical device array, according to an exemplary embodiment.

Figure 6A:
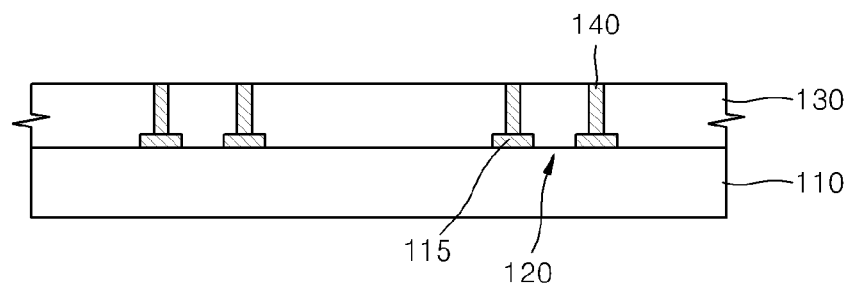
FIGS. 6A through 6K are views for describing a method of manufacturing a variable optical device array, according to an exemplary embodiment.
Figure 6B:
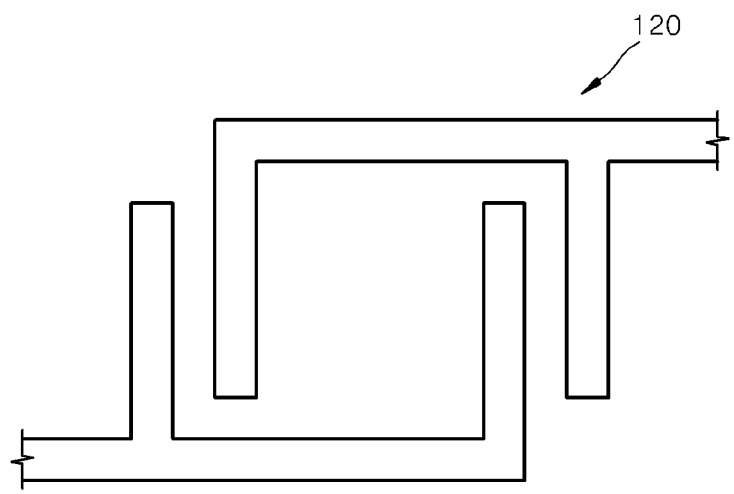

Referring to FIG. 6A, the addressing layer 120, including the electrode wire 115 arranged in the predetermined pattern, is formed on the first substrate 110. The first substrate 110 may be formed of glass having a transparent characteristic, or a transparent plastic material. The electrode wire 115 formed in the addressing layer 120 may have, for example as shown in FIG. 6B, a shape including a plurality of electrodes electrically separated from each other. For example, when a plurality of cell regions are to be formed in a two-dimensional array, the shape shown in FIG. 6B may be divided into two so as to equally drive cell regions on the same column from among the plurality of cell regions.

Also, the addressing layer 120 may further include a plurality of transistors (not shown) for independently driving the plurality of cell regions to be formed.

The insulation layer 130 may cover the entire electrode wire 115 forming the addressing layer 120. Also, the plurality of conductive through-holes 140 connected to the electrode wire 115 through the insulation layer 130 may be formed.

Figure 6C:
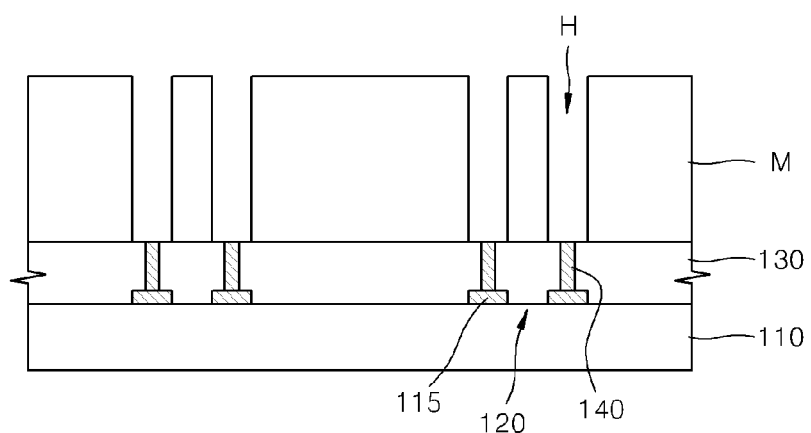

Then, as shown in FIG. 6C, a photoresist mold M is formed. The photoresist mold M is provided to form a barrier wall portion dividing the plurality of cell regions on the addressing layer 120. Accordingly, the photoresist mold M is patterned to a shape corresponding to an inverse image of the barrier wall portion to be formed, and as shown in FIG. 6C, may have a plurality of holes H at locations corresponding to the conductive through-holes 140. To form the photoresist mold M, a photoresist, such as SU-8 or KMPR, may be used.

Figure 6D:
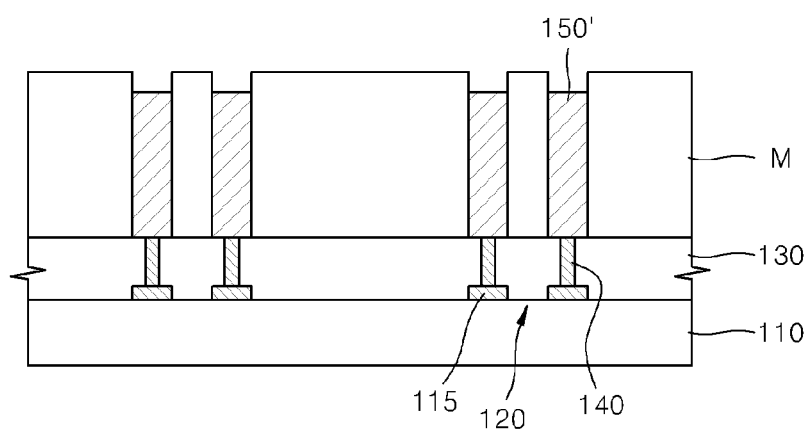

Then, as shown in FIG. 6D, a metal material layer 150' is formed in the holes H. The metal material layer 150' may be formed via electroplating or deposition. Here, for electroplating, a seed layer (not shown) may be formed throughout on the addressing layer 120 before the photoresist mold M is formed.

Figure 6E:
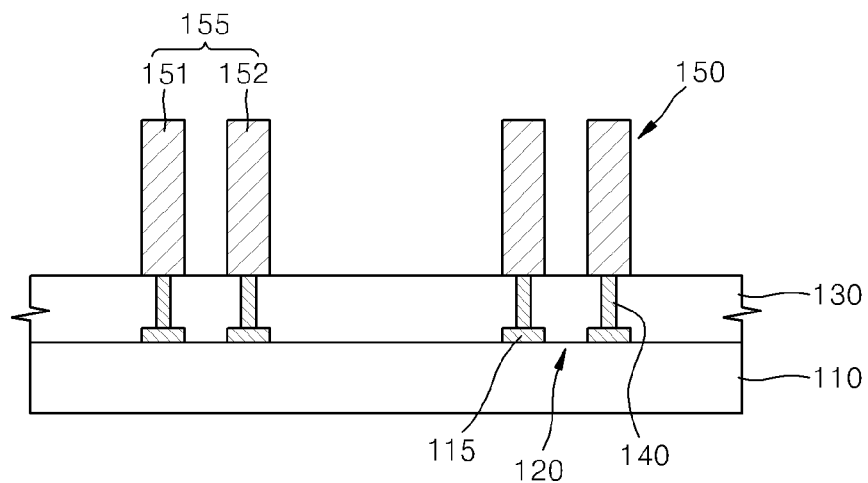
Figure 6F:
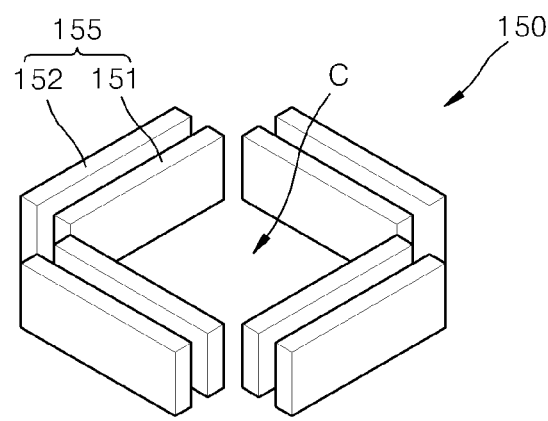

Then, when the photoresist mold M is removed, the barrier wall portion 150 wherein the pair of conductive barrier walls 151 and 152 constitutes the double wall 155, as shown in FIG. 6E, is formed. FIG. 6F shows one cell region C formed by the barrier wall portion 150.

The barrier wall portion 150 formed as above uses a general photolithography method without modification, but problems due to light diffraction or non-uniform exposure are not generated. Also, the conductive barrier walls 151 and 152 constituting the barrier wall portion 150 are separated from each other and are electrically connected to the addressing layer 120 through the conductive through-holes 140, and thus, addressing to independently perform an electrowetting operation in each cell region C is easily performed.

Figure 6G:
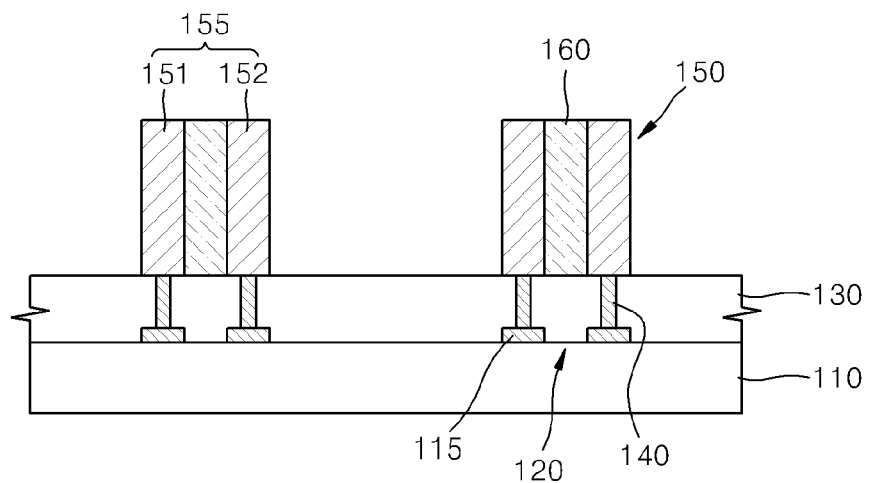
Figure 6H:
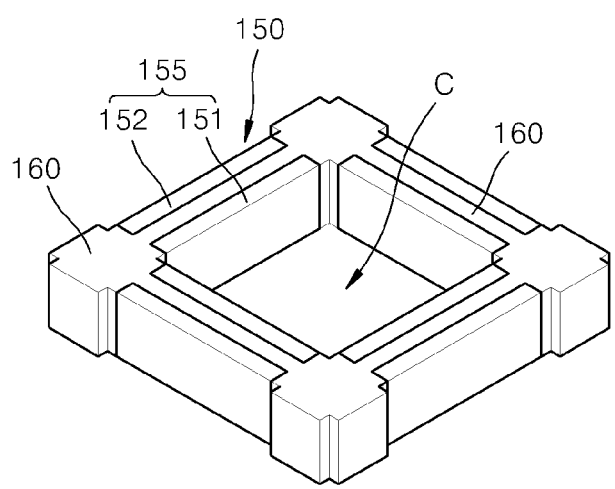

Then, as shown in FIG. 6G, the insulation material 160 is formed between each pair of the conductive barrier walls 151 and 152 constituting the double wall 155. Here, as shown in FIG. 6H, the insulation material 160 may entirely connect regions between the adjacent double walls 155.

Figure 6I:
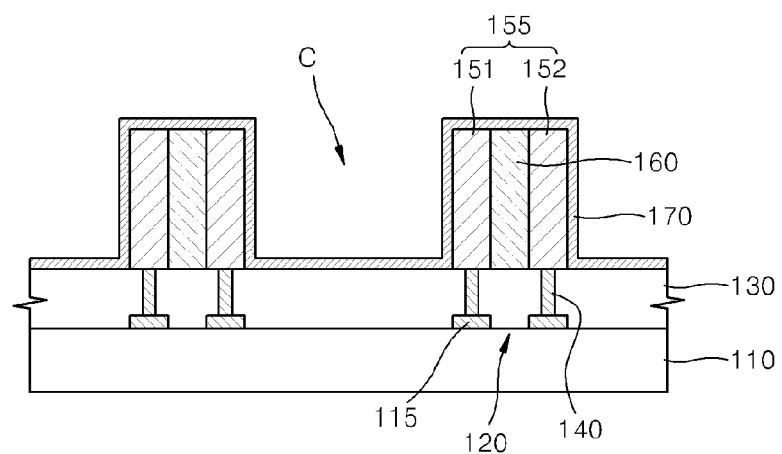

Then, as shown in FIG. 6I, the insulation coating layer 170 is formed on the top surfaces of the conductive barrier walls 151 and 152 and the side surfaces of the cell regions C, which are inner walls of the cell regions C. As shown in FIG. 6I, the insulation coating layer 170 may be formed throughout the barrier wall portion 150, the insulation material 160, and the bottom surfaces of the cell regions C.

Figure 6J:
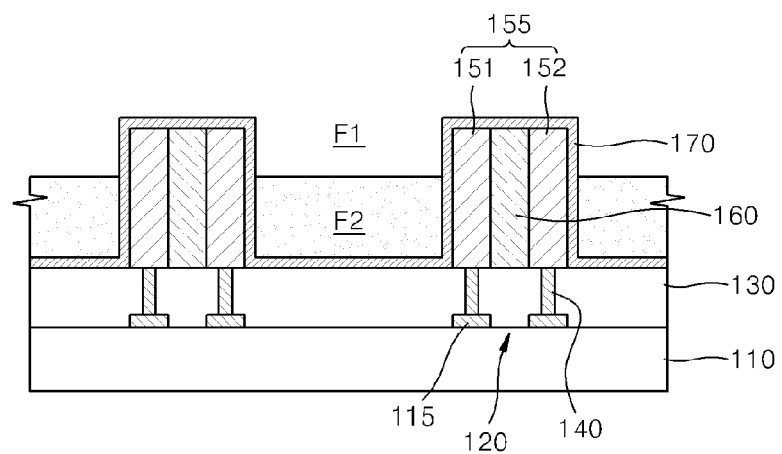

Then, as shown in FIG. 6J, the conductive first fluid F1 and the nonconductive second fluid F2 are disposed in the cell regions. As shown in FIG. 6J, the conductive first fluid F1 and the nonconductive second fluid F2 are disposed such as not to be mixed with each other, wherein the conductive first fluid F1 is disposed on the nonconductive second fluid F2 to contact the transparent electrode layer 180. The conductive first fluid F1 may be a polar fluid, and the nonconductive second fluid F2 may be a nonpolar fluid. The conductive first fluid F1 may be an electrolyte, such as water or salt water. The nonconductive second fluid F2 may be an oil.

Figure 6K:
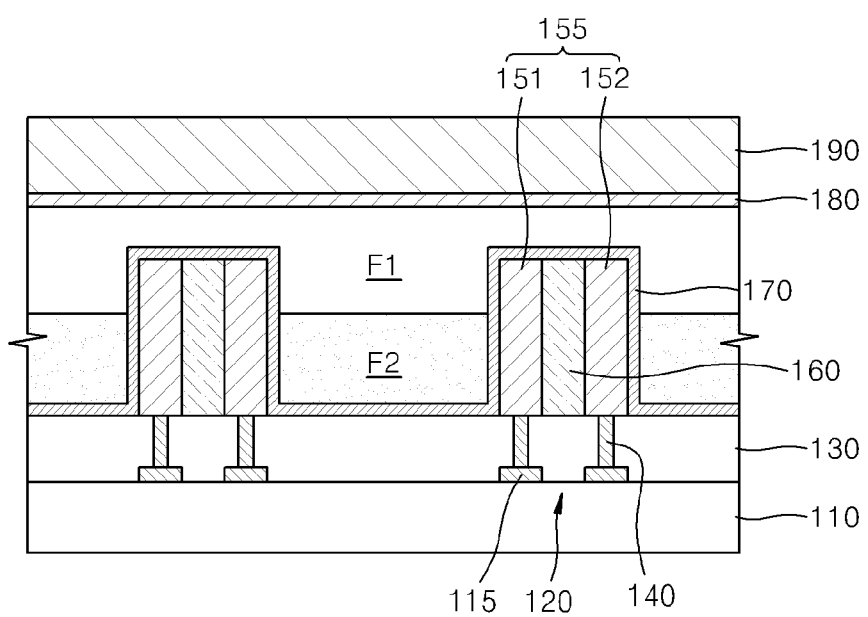

Then, as shown in FIG. 6K the transparent electrode layer 180 is formed to entirely cover the cell regions. The transparent electrode layer 180 may be formed on the transparent second substrate 190 and then, may be disposed on the cell regions.

Also, although not shown in FIG. 6K, the voltage applying unit for applying a voltage between the transparent electrode layer 180 and the addressing layer 120 may be further formed. Alternatively, as shown in FIG. 5, the structure of measuring electrostatic capacity and feeding back the result of measuring to adjust the applied voltage may be further included.

Also, according to the exemplary method, the conductive barrier walls 151 and 152 may be formed according to a general photolithography process, and problems regarding a non-uniform exposure may not occur.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

What is claimed is:

1. A variable optical device array comprising:
   a transparent substrate;
   an addressing layer disposed on the transparent substrate and comprising an electrode wire arranged in a predetermined pattern;
   a barrier wall portion disposed on the addressing layer to define a plurality of cell regions and comprising a plurality of conductive barrier walls that are electrically connected to the electrode wire, wherein pairs of the plurality of conductive barrier walls are arranged to form double walls surrounding cell regions;
   an insulation material filling a region between each pair of conductive barrier walls forming the double walls;
   a conductive first fluid and a nonconductive second fluid disposed in each of the plurality of cell regions, wherein the first and second fluids are not mixed;
   an insulation coating layer disposed on a top surface of each of the plurality of conductive barrier walls and on side surfaces of each of the plurality of cell regions;
   a transparent electrode layer covering the plurality of cell regions; and
   a voltage applying unit that that is configured to apply a voltage between the transparent electrode layer and the addressing layer.

2. The variable optical device array of claim 1, further comprising an insulation layer disposed between the addressing layer and the barrier wall portion.

3. The variable optical device array of claim 2, wherein the plurality of conductive barrier walls and the electrode wire are connected via a plurality of conductive through-holes penetrating through the insulation layer.

4. The variable optical device array of claim 1, wherein the electrode wire comprises a plurality of electrodes that are electrically separated from each other.

5. The variable optical device array of claim 4, wherein the plurality of cell regions are arranged in a-two-dimensional array, and the plurality of electrodes are separated in a pattern that equally drives cell regions on a same column from among the plurality of cell regions.

6. The variable optical device array of claim 4, wherein the addressing layer further comprises a plurality of transistors for independently driving each of the plurality of cell regions.

7. The variable optical device array of claim 4, further comprising a control unit configured to measure an interface shape between the conductive first fluid and the nonconductive second fluid within each of the plurality of cell regions, and feed back a result of measuring to the voltage applying unit to adjust the voltage between the transparent electrode layer and the addressing layer.

8. The variable optical device array of claim 7, further comprising an apparatus for measuring electrostatic capacity between the transparent electrode layer and any one of the plurality of electrodes.

9. The variable optical device array of claim 1, wherein the conductive first fluid is a polar fluid and the nonconductive second fluid is a nonpolar fluid.

10. The variable optical device array of claim 1, wherein the conductive first fluid is an electrolyte and the nonconductive second fluid is oil.

11. A method of manufacturing a variable optical device array, the method comprising:
   forming an addressing layer comprising an electrode wire arranged in a predetermined pattern on a transparent substrate;
   forming a barrier wall portion on the addressing layer to define a plurality of cell regions, wherein the barrier wall portion comprises a plurality of conductive barrier walls electrically connected to the electrode wire, pairs of the plurality of conductive barrier walls are arranged to form double walls surrounding the plurality of cell regions;
   filling a space between each of the double walls with an insulation material;
   forming an insulation coating layer on a top surface of each of the plurality of conductive barrier walls and sides of each of the plurality of cell regions;
   disposing a conductive first fluid and a nonconductive second fluid in each of the plurality of cell regions, wherein the first and second fluids are not mixed; and
   forming a transparent electrode layer on the plurality of cell regions.

12. The method of claim 11, further comprising, before the forming of the barrier wall portion, forming an insulation layer on the addressing layer.

13. The method of claim 12, further comprising forming a plurality of conductive through-holes penetrating through the insulation layer, wherein the through-holes are connected to the electrode wire through the insulation layer.

14. The method of claim 11, wherein the electrode wire comprises a plurality of electrodes that are electrically separated from each other.

15. The method of claim 14, wherein the plurality of cell regions are arranged in a two-dimensional array, and the plurality of electrodes are separated in a pattern that equally drives cell regions on the same column from among the plurality of cell regions.

16. The method of claim 14, wherein the addressing layer further comprises a plurality of transistors for independently driving each of the plurality of cell regions.

17. The method of claim 11, wherein the conductive first fluid is a polar fluid and the nonconductive second fluid is a nonpolar fluid.

18. The method of claim 11, wherein the conductive first fluid is an electrolyte and the nonconductive second fluid is oil.

19. The method of claim 11, wherein the forming of the barrier wall portion comprises:
   forming a photoresist mold comprising a plurality of holes respectively corresponding to the plurality of conductive barrier walls, on the addressing layer; and
   forming a metal material in the plurality of holes.

20. The method of claim 19, wherein the photoresist mold is formed of SU-8 photoresist or KMPR.

* * * * *